(12) United States Patent
Sagou

(10) Patent No.: US 8,711,103 B2
(45) Date of Patent: Apr. 29, 2014

(54) INFORMATION DISPLAY DEVICE AND PROGRAM STORING MEDIUM

(75) Inventor: Yuuichi Sagou, Akishima (JP)

(73) Assignee: NEC Corporation, Tokyo (JP)

( * ) Notice: Subject to any disclaimer, the term of this patent is extended or adjusted under 35 U.S.C. 154(b) by 796 days.

(21) Appl. No.: 12/208,964

(22) Filed: Sep. 11, 2008

(65) Prior Publication Data

US 2009/0066666 A1  Mar. 12, 2009

(30) Foreign Application Priority Data

Sep. 12, 2007  (JP) ................................. 2007-236236

(51) Int. Cl.
*G06F 3/041*  (2006.01)

(52) U.S. Cl.
USPC ........................................ 345/173; 178/18.01

(58) Field of Classification Search
USPC .................. 345/173–176; 178/18.1
See application file for complete search history.

(56) References Cited

U.S. PATENT DOCUMENTS

| 2004/0178994 | A1* | 9/2004 | Kairls, Jr. ...................... 345/173 |
| 2005/0012723 | A1* | 1/2005 | Pallakoff ....................... 345/173 |
| 2005/0017947 | A1* | 1/2005 | Shahoian et al. ............. 345/156 |
| 2005/0024341 | A1* | 2/2005 | Gillespie et al. .............. 345/173 |
| 2005/0156904 | A1  | 7/2005 | Katayose |
| 2006/0022955 | A1* | 2/2006 | Kennedy ........................ 345/173 |
| 2006/0077182 | A1* | 4/2006 | Studt .............................. 345/173 |
| 2006/0161846 | A1* | 7/2006 | Van Leeuwen ............... 715/702 |
| 2008/0165133 | A1* | 7/2008 | Blumenberg et al. ......... 345/173 |

FOREIGN PATENT DOCUMENTS

| CN | 1717648 | 1/2006 |
| JP | 06-309102 | 11/1994 |
| JP | 08-249122 | 9/1996 |
| JP | 10-049305 | 2/1998 |
| JP | 2000-322169 | 11/2000 |
| JP | 2001-109557 | 4/2001 |
| JP | 2001-195170 | 7/2001 |
| JP | 2001-242981 | 9/2001 |
| JP | 2002-062966 | 2/2002 |
| JP | 2002-351618 | 12/2002 |
| JP | 2003-271294 | 9/2003 |
| JP | 2004-094389 | 3/2004 |
| JP | 2005-56286 | 3/2005 |
| JP | 2005-078342 | 3/2005 |
| WO | WO 99/54807 | 10/1999 |

* cited by examiner

*Primary Examiner* — Premal Patel
(74) *Attorney, Agent, or Firm* — Cozen O'Connor

(57) ABSTRACT

A CPU determines whether or not the display position of a link character string is finger-touched when a touch sensor on a screen constituting a display unit is finger-touched, and when the link character string is touched, a user is informed that a jump to a link destination is possible through screen vibration or the like.

8 Claims, 7 Drawing Sheets

INFORMATION DISPLAY DEVICE AND PROGRAM STORING MEDIUM

BACKGROUND OF THE INVENTION

1. Field of the Invention

The present invention relates to an information display device which displays various kinds of information on a screen having a finger touch sensor, and a program storing medium for the same.

2. Description of the Related Art

In general, a browser function of an information display device which displays a home page provided with various links can perform link jump by indicating a link display position on the displayed homepage. An example of the way of indication is a way of pointing out a link position by a mouse pointer (cursor) displayed on the screen and mouse click. In a case of a screen having a touch panel, indication is carried out by directly touching an arbitrary display position using a pen or a finger.

In a case where an arbitrary position is indicated using a mouse pointer, a pointer shape changes when the mouse pointer reaches a link position, so that it is possible to easily confirm whether or not the link position is surely indicated through the pointer shape. In the case of a touch panel, however, an indicated position itself is hidden by a finger, so that an indicated target becomes less visible, and it is difficult to confirm a link position through a change in the pointer shape. Accordingly, it is very difficult to confirm whether or not a link position is surely touched under present circumstances.

Unexamined Japanese Patent Application KOKAI Publication No. 2005-56286 discloses a technology which enlarges the vicinity of a touch position since it is difficult to indicate a tiny position in touching that position by a finger, as explained above.

SUMMARY OF THE INVENTION

An information display device of the invention displays various information on a display screen having a finger touch sensor, and the information display device comprises:

a detection unit that detects an indicated position indicated by a finger touch to the display screen;

a determination unit that determines whether or not a display of link indication information is included within a display range having a predetermined size on the display screen and being defined by the indicated position detected by the detection unit, wherein the link indication information indicates a jump to a link destination; and an informing unit which informs a user that the link indication information is included within the display range when the determination unit determines that the link indication information is included within the display range.

A program storing medium of the invention stores a program that allows a computer to realize:

a function of detecting an indicated position indicated by a finger touch to a display screen having a finger touch sensor;

a function of determining whether or not a display of link indication information is included within a display range having a predetermined size on the display screen and being defined by the detected indicated position, wherein the link indication information indicates a jump to a link destination; and a function of informing a user that the link indication information is included within the display range when it is determined that the link indication information is included within the display range.

As explained above, according to the invention, even if link indication information is hidden by a finger touch operation to a screen, it is possible to confirm whether or not the display position of that information is touched by a finger, resulting in a certain and rapid indication operation.

BRIEF DESCRIPTION OF THE DRAWINGS

The object and other objects and advantages of the present invention will become more apparent upon reading of the following detailed description and the accompanying drawings in which.

DETAILED DESCRIPTION OF THE PREFERRED EMBODIMENT

An explanation will be given of an embodiment of the present invention with reference to accompanying drawings FIGS. 1 to 7.

Figure 1:
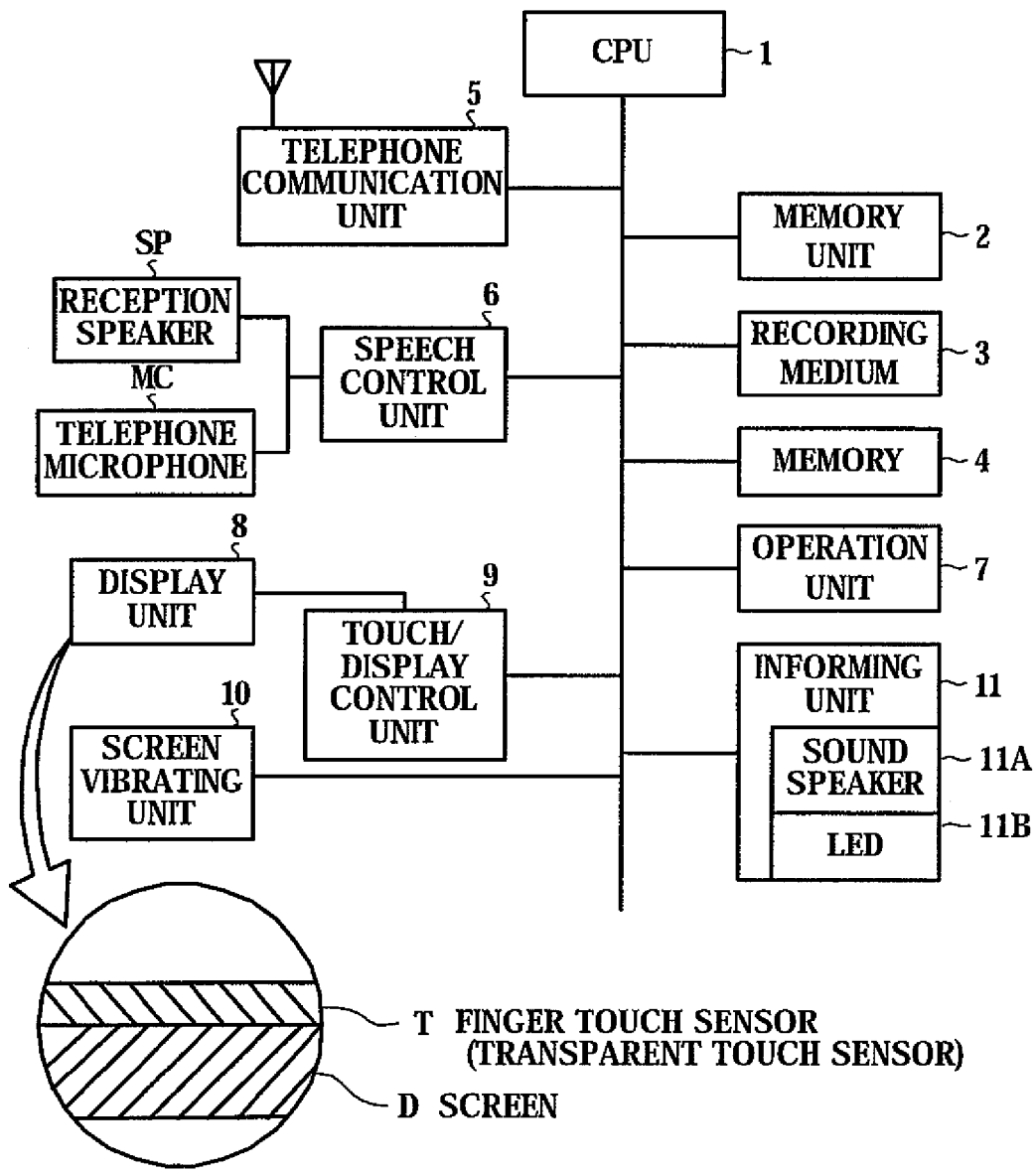
FIG. 1 is a block diagram showing basic structural components of a cellular phone device used as an information display device.

The embodiment exemplifies a case where a cellular phone device is used as an information display device, and FIG. 1 is a block diagram showing basic structural components thereof.

A cellular phone device is a biaxial-rotation type cellular phone device having two casings (operation unit casing and display unit casing) openably and rotatably attached together. The cellular phone device has various kinds of functions, such as a communication function (call function), electronic mail function, an Internet connection function (Web access function), and a Web browser function. Note that the Web browser function can browse a web page for PC (Personal Computer) in addition to a web page for cellular phone device.

A CPU 1 is a core central processing unit which controls the entire operation of the cellular phone device in accordance with various programs stored in a memory unit 2. The memory unit 2 is an internal memory, and has a program area and a data area. The program area stores a program for realizing the embodiment in accordance with operation procedures shown in FIGS. 3 and 4 to be discussed later. A recording medium 3 is a removable and transportable memory and comprises, for example, an SD card, or an IC card. A memory 4 is an internal memory which has a work area, and various data in the memory 4 are saved in the memory unit 2 as necessary.

A telephone communication unit 5 acquires a signal from the reception side of a transmission/reception unit (baseband unit) connected to an antenna constituting a wireless unit, demodulates that signal to a reception baseband signal, and causes a reception speaker SP to output that baseband signal as speech through a speech control unit 6. Moreover, the telephone communication unit 5 acquires input speech from a telephone microphone MC through the speech control unit 6, encodes the input speech to a transmission baseband signal, provides that baseband signal to the transmission side of the transmission/reception unit, and causes the transmission/reception unit to transmit and output that signal through the antenna. An operation unit 7 is for inputting a number to be dialed, a character, a command, and the like, and the CPU 1 executes a process in accordance with a key input signal from the operation unit 7.

As shown in an illustrated partially enlarged sectional view, a display unit 8 has a highly-fine screen D using a liquid crystal, an organic EL, and the like, and a finger touch sensor (transparent touch sensor) T is stacked and positioned on the top surface of the screen D. Thus, the display unit 8 is a touch screen (touch display unit) constituted by the screen D and the transparent touch sensor T, and functions as a display unit of the invention and a touch operation unit thereof. Display data received and acquired through the telephone communication unit 5 by the electronic mail function or the Internet connection function is provided to the display unit 8 through a touch/display control unit 9, and displayed on the display unit 8. The touch/display control unit 9 controls a display operation, and controls a detection operation of a finger touch. The touch/display control unit 9 reads out a touch condition when the touch sensor T on the screen D is touched, and supplies a finger-touch ON signal and the read-out touch condition to the CPU 1.

A screen vibrating unit 10 vibrates the screen D constituting the display unit 8 using a piezoelectric effect. The screen vibrating unit 10 applies a voltage to a vibration device (not shown) like a transparent panel embedded in the screen D, thereby vibrating the screen D. Note that the way of vibration, such as vibrating only a part touched by a finger or vibrating substantially the entire region of the screen D, is arbitrary. An informing unit 11 comprises a sound speaker 11A, an LED (Light Emitting Diode) 11B, and the like, and is driven during informing of an incoming signal. In the embodiment, when the touch sensor T is touched by a finger, the informing unit 11 performs notification in accordance with a touched position.

Figure 2:
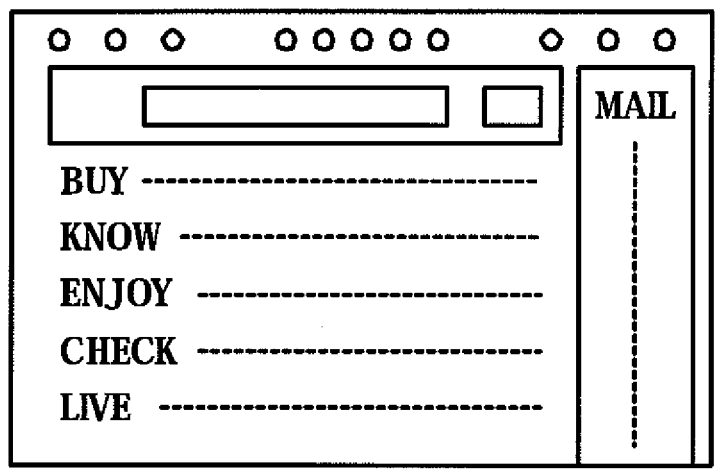
FIG. 2 is a conceptual diagram showing a state where a Web page for PC is displayed on a display unit by a Web browser function.

FIG. 2 is a conceptual diagram showing a state where a Web page for PC is displayed on the display unit 8 by the Web browser function. The Web page exemplifies a top page (home page) of a communication common carrier. On the screen, various information including link indication information (link character strings) indicating a jump to a linked page are displayed, but because the Web page for PC is reduced in size to a cellular phone screen size, the display size thereof is very small. Accordingly, even if a user attempts to touch a link character string by a finger, the link character string is hidden by the finger. In order to cause the user to realize that the link character string is surely touched even if the display position of the link character string is hidden by a finger when the touch sensor T on the screen D is touched by the finger, the CPU 1 informs the user that a jump to the linked destination is possible by, for example, vibrating the screen when the display position of the link character string is touched by a finger.

Next, the operation of the cellular phone device according to the embodiment will be explained with reference to the flowcharts of FIGS. 3 and 4. Each function described in these flowcharts is stored in the program area of the memory unit 2 as a readable program code. Operations according to the program codes are successively executed. Note that it is possible to successively execute operations in accordance with the foregoing program codes transmitted through a transmission medium. That is, a program/data externally supplied from the transmission medium, in addition to the recording medium, can be used to execute the operations of the embodiment. Note that, of the general operations of the cellular phone device, FIGS. 3 and 4 are flowcharts showing only operations characteristic of the embodiment, and when the process exits the flows in FIGS. 3 and 4, the process returns to the flow of the general operations (not shown).

Figure 3:
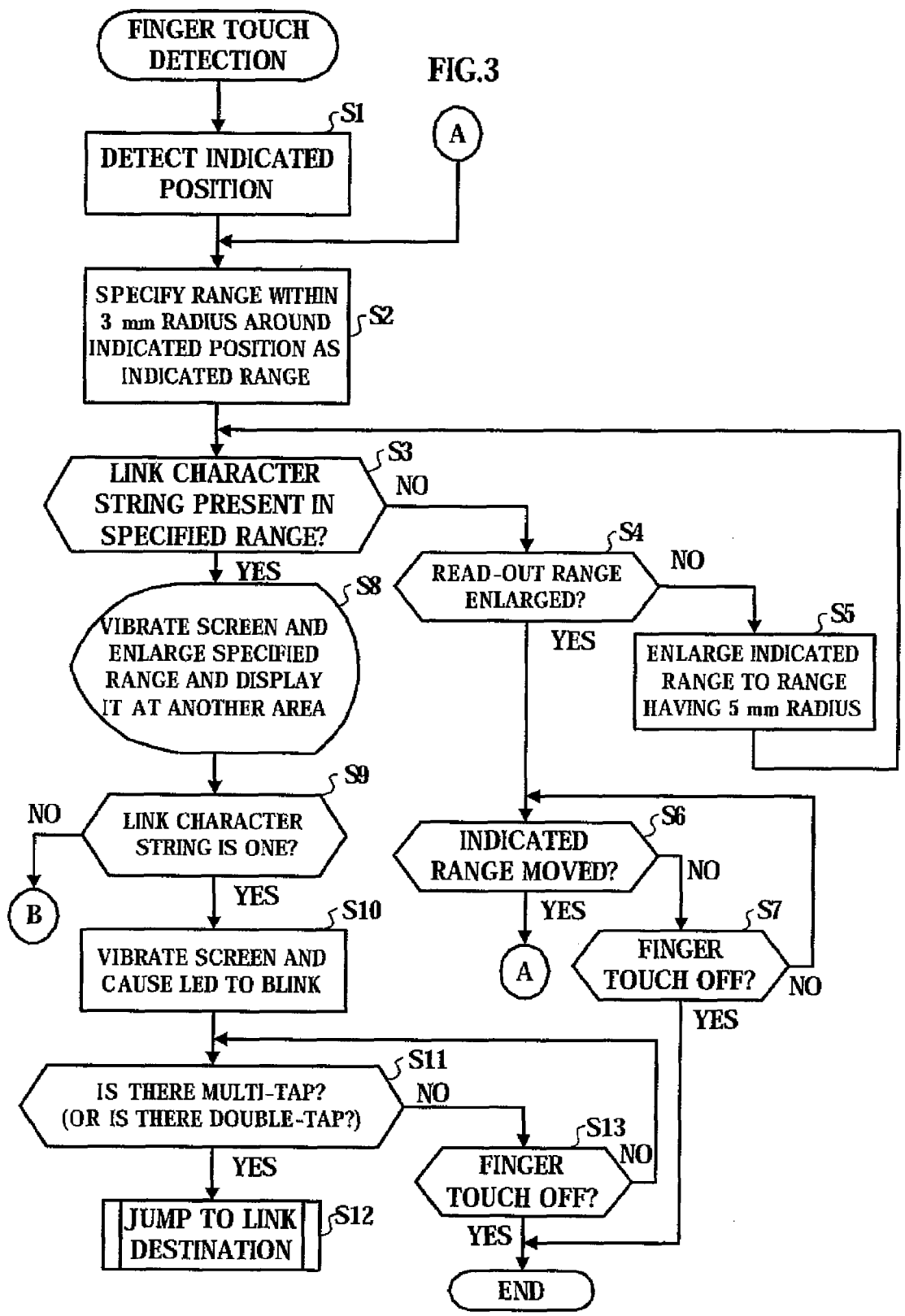
FIG. 3 is a flowchart showing an operation whose execution is commenced in response to a finger-touch ON signal from a touch/display control unit when a touch sensor on a screen constituting the display unit is touched by a finger.
Figure 4:
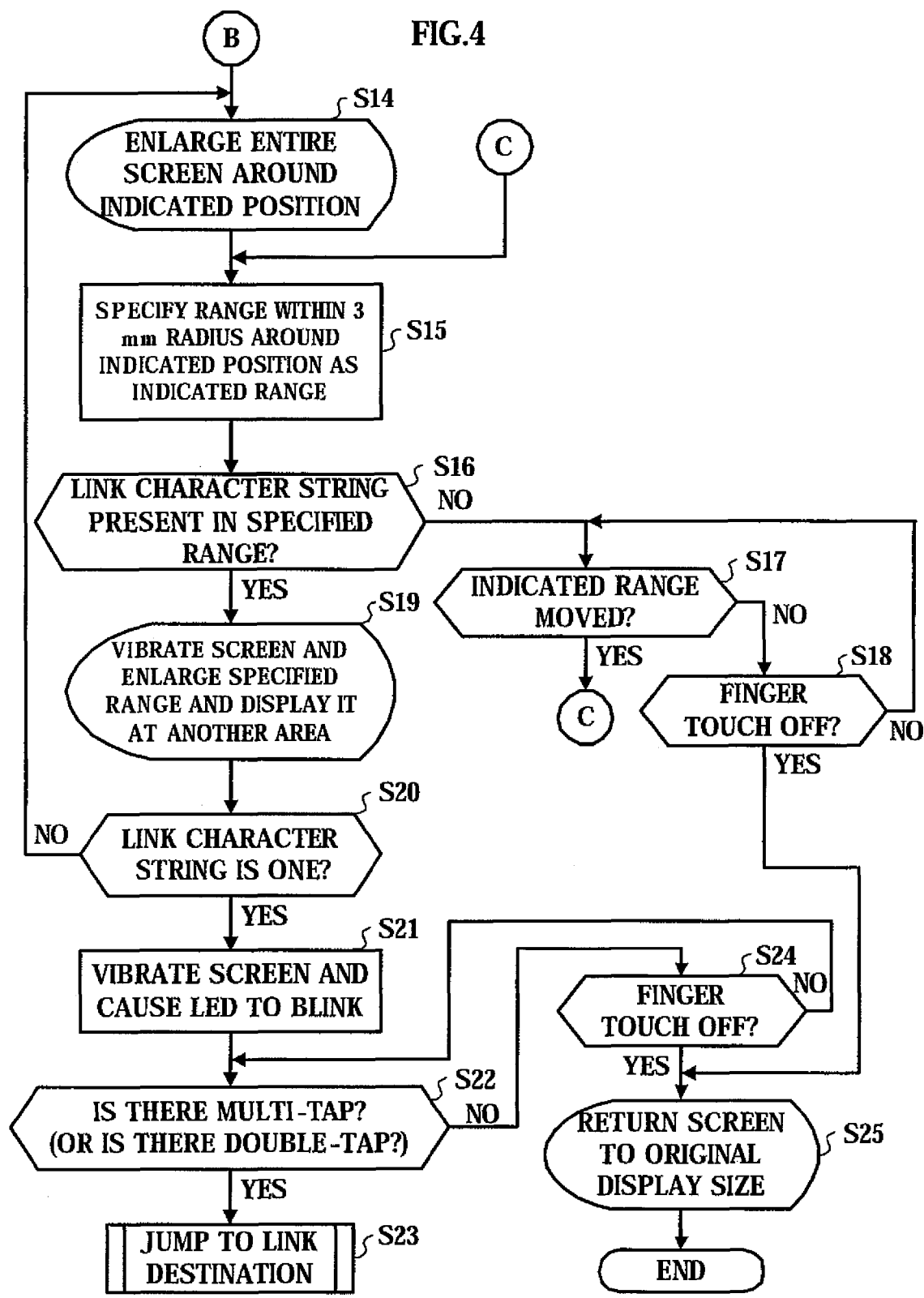
FIG. 4 is a flowchart continuous from FIG. 3.

FIGS. 3 and 4 are flowcharts showing an operation whose execution is commenced in response to a finger-touch ON signal from the touch/display control unit 9 when the touch sensor T on the screen D constituting the display unit 8 is touched by a finger.

First, the CPU 1 detects the center of a touch point as an indicated position by a finger based on a finger touch condition read out by the touch/display control unit 9 (step S1). Next, the CPU 1 specifies a predetermined range (e.g., a range within a 3 mm radius) around the center of the indicated position as an indicated range (step S2). The CPU 1 determines whether or not the display position of a link character string is included in the indicated range, i.e., whether or not the display position of the link character string is finger-touched by comparing the indicated range with the display position of the link character string (step S3).

When the link character string is not included in the indicated range (step S3: NO), the CPU 1 determines whether or not the indicated range has been enlarged (step S4). Initially, the indicated range has not been enlarged yet so (step S4: NO), the process progresses to a process of enlarging the indicated range, the CPU 1 specifies a predetermined range (e.g., a range within a 5 mm radius) around the center of the touch point (indicated position) as an enlarged indicated range (step S5), and the process returns to the step S3. When the indicated range is enlarged but the link character string is not included in the enlarged indicated range (step S3: NO), the indicated range has been enlarged at this time (step S4: Yes), so the CPU 1 determines whether or not the indicated position is moved, i.e., whether or not the indicated position is slid and moved while the user is touching the indicated position with a finger by comparing a previous indicated position with a current indicated position (step S6). When the indicated position is not moved (step S6: No), the CPU 1 determines whether or not the finger is released from the touch sensor T (whether or not a finger touch is released (OFF)) (step S7).

When the finger touch is released (step S7: YES), the process exits this flow, and returns to the general flow. When the CPU 1 detects that the indicated position is moved (step S6: YES), the process returns to the step S2, and the CPU 1 determines whether or not a link character string is included in the indicated range. When it is determined that a link character string is included in an indicated range through such operations (step S3: YES), the screen vibrating unit 10 is driven for a certain time (e.g., several seconds), and the indicated range or the entire region of the screen D is vibrated. Further, the link character string in the indicated range is enlarged and displayed at another position (another area) different from the indicated range, thereby informing the user that a jump to a link destination is possible (step S8).

Figure 5:
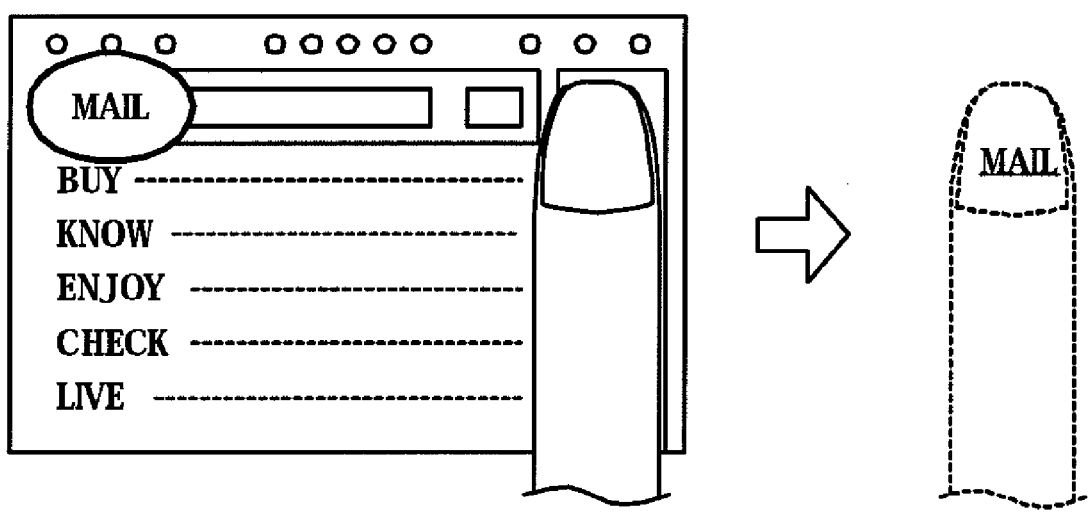
FIG. 5 is a diagram showing a display example when a link character string (e.g., a link character string partially or wholly hidden by a finger operation) in an indicated range is enlarged and displayed at another position different from the indicated range.

FIG. 5 is a diagram showing a display example when a link character string (e.g., a link character string partially or wholly hidden by a finger operation) in an indicated range is enlarged and displayed at another position different from the indicated range. Note that the example in the drawing exemplifies a case where the display position of a link character string "mail" is touched, and another screen (an enlarged screen of the link character string) is displayed on either right or left side of the upper region of an operating finger in an overlapped manner. An area surrounded by a thick line in the drawing represents the enlarged screen of the link character string. Next, the CPU 1 determines whether or not there is one link character string in the indicated range or more (step S9). In a case where there is one link character string in the indicated range (step S9: Yes), the screen vibrating unit 10 is driven for a predetermined time (e.g., several seconds) to vibrate the indicated range or to vibrate substantially the entire region of the screen D. The LED 11B which constitutes the informing unit 11 is caused to blink to inform the user that a jump to the link destination is possible (step S10).

The CPU 1 determines whether or not another finger touches an arbitrary position on the screen D with an operating finger touching the screen D being held as it is, and whether or not a predetermined button of the operation unit 7 is operated (step S11). When there is such an operation, the CPU 1 determines that there is a multi-tap (double-tap) operation. In this case (step S11: YES), a page is jumped to a link destination represented by the link character string in the indicated range (step S12). For example, in a case where the display position of a link character string "mail" is touched, the electronic mail function is activated together with the Internet connection function, and a mail screen is displayed. When an operating finger touching the screen is released (finger touching is released (OFF)) (step S11: NO and step S13: YES), the process progresses to the foregoing general flow.

On the other hand, when there are plural of link character strings in the indicated range (step S9: NO), the process progresses to the flow shown in FIG. 4, and the entire content of the screen D centered on the indicated point (central point of touching) is enlarged at one stage (step S14).

Figure 6:
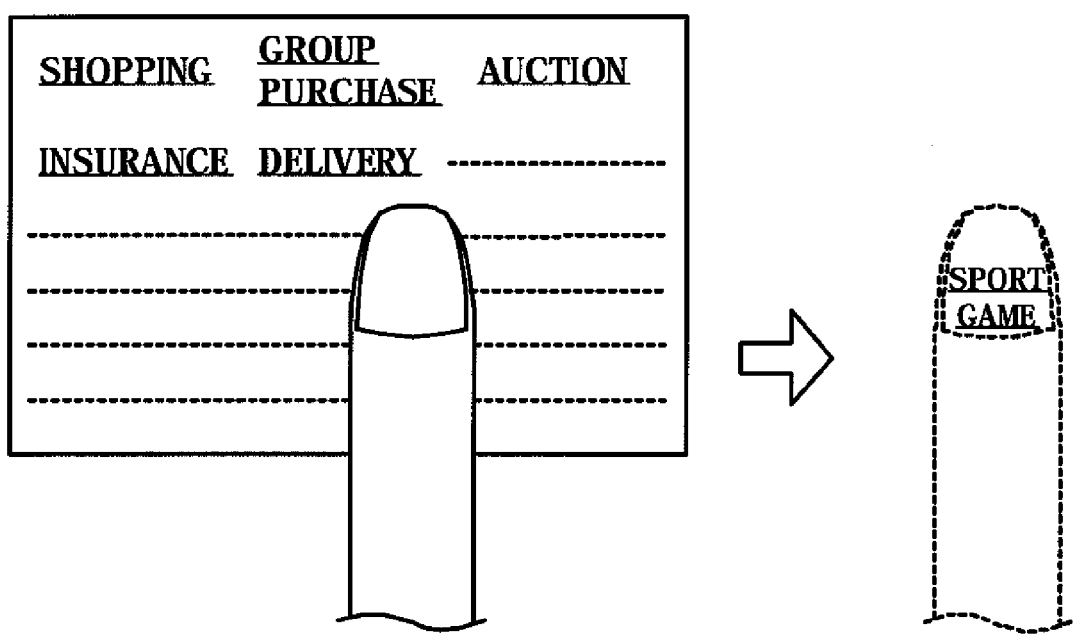
FIG. 6 is a diagram showing a display example of enlarging the whole content of a screen when a plurality of link character strings are present in an indicated range.

FIG. 6 is a diagram showing a display example of enlarging the whole content of a screen when a plurality of link character strings are present in an indicated range. Note that the example in the drawing exemplifies a case where a plurality of link character strings (sport and game) are in the indicated range and the entire screen centered of the indicated position is displayed and enlarged.

The entire screen is enlarged at one stage and displayed in this manner, and as in the foregoing case, the CPU 1 specifies a predetermined range (e.g., a range within a 3 mm radius) around the indicated position (center) as an indicated range (step S115). The CPU 1 determines whether or not the display position of a link character string is included in the indicated range, i.e., whether or not the display position of the link character string is touched by a finger by comparing the indicated range with the display position of the link character string (step S16).

When the link character string is not included in the indicated range (step S16: NO), the CPU 1 determines whether or not the indicated position is moved, i.e., whether or not the indicated position is slid and moved while the user keeps touching the indicated position with the finger (step S17). When the indicated position is not moved (step S17: NO), the CPU 1 determines whether or not the finger is released from the touch sensor T (the finger touch is released (OFF)) (step S18). When the finger touch is released (step S118: YES), the enlarged display of the entire screen is returned to the original display size (step S25), and the process returns to the foregoing general flow. When the indicated position is moved (step S17: YES), the process returns to the step S15, the foregoing operations are repeated, and the CPU 1 determines whether or not a link character string is included in an indicated range.

Figure 7:
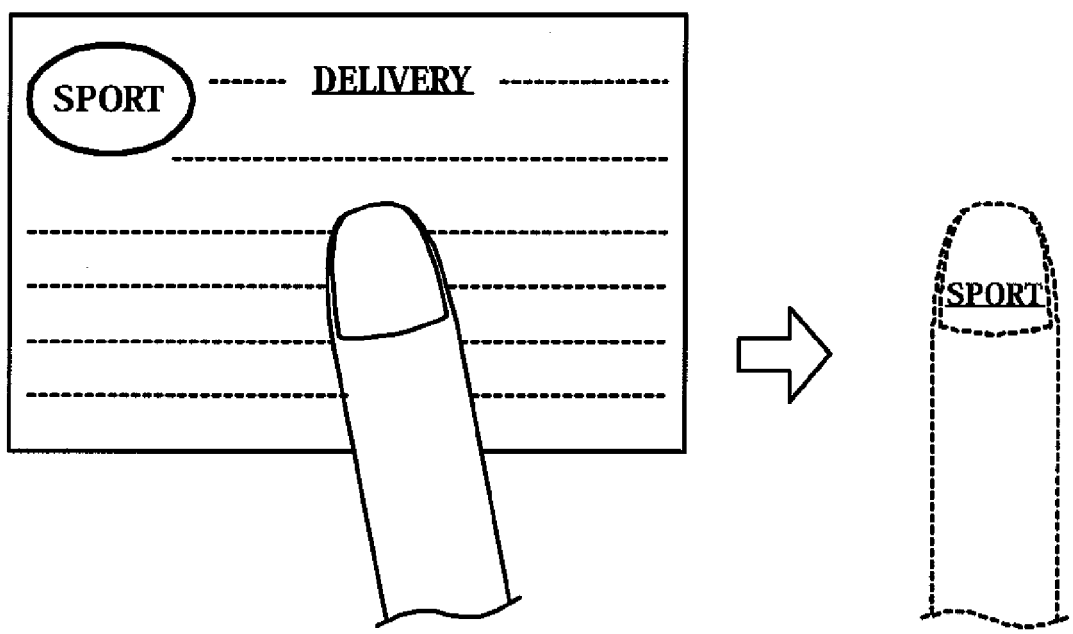
FIG. 7 is a diagram showing a display example of enlarging a link character string in an indicated range and displaying at another position different from the indicated range.

When a link character string becomes included in an indicated range through the foregoing operations (step S16: YES), the screen vibrating unit 10 is driven for a predetermined time (e.g., several seconds) to vibrate the indicated range or to vibrate substantially the entire region of the screen D. A link character string in the indicated range is enlarged and displayed at another position (another area) different from the indicated range to inform the user that a jump to the link destination is possible (step S19). FIG. 7 is a diagram showing a display example of enlarging a link character string in an indicated range and displaying at another position different from the indicated range.

Next, the CPU 1 determines whether or not there is one link character string in the indicated range or more (step S20). When there are plural of link character strings in the indicated range (step S20: NO), the entire screen around the indicated position is enlarged at one stage (step S14), and the foregoing operations are repeated. On the other hand, when there is one link character string in the indicated range (step S20: YES), the screen vibrating unit 10 is driven for a predetermined time (e.g., several seconds) to vibrate the indicated range or to vibrate substantially the entire region of the screen D. Furthermore, the LED 11B constituting the informing unit 11 is caused to blink to inform the user that a jump to the link destination is possible (step S21).

The CPU 1 determines whether or not another finger touches an arbitrary position on the screen D with an operating finger touching the screen D being held as it is, and whether or not a predetermined button of the operation unit 7 is operated (step S22). When there is such an operation, the CPU 1 determines that there is a multi-tap operation (double-tap operation). In this case (step S22: YES), a page is jumped to the link destination represented by the link character string in the indicated range (step S23). When the operating finger touching the screen D is released (the finger touch is released (OFF)) (step S22: NO and step S24: YES), the process progresses to step S25, the enlarged display of the entire screen is returned to the original display size, and the process returns to the foregoing general flow.

As explained above, according to the embodiment, when a finger touches the touch sensor T on the screen D constituting the display unit 8, the CPU 1 determines whether or not the display position of a link character string is touched by the finger, and when the link character string is touched, the CPU 1 informs the user that a jump to the link destination is possible by, for example, vibrating the screen. Accordingly, even if a link character string is hidden by a finger-touch operation to the screen, it is possible to confirm whether or not the display position of the link character string is surely touched by the finger, resulting in a certain and rapid indication operation.

Notification by vibrating the screen, notification by enlarging a link character string and displaying the enlarged link character string at another position, and notification by blinking the LED are carried out. Accordingly, it is possible to surely let the user know that the link character string is touched.

When a link character string becomes included in an indicated range, the link character string in the indicated range is displayed at another position (another area) different from the indicated range. Accordingly, even if the link character string is hidden by a finger-touch operation, the link character string can be easily confirmed. In this case, because the link character string is enlarged and displayed at another position, even if the original display of the link character string is small, the link character string can be easily confirmed.

A page is jumped to a link destination when a further predetermined operation is carried out in addition to a finger-touch operation to the display position of a link character string. Accordingly, the selection operation of the link character string can be distinguished from the execution operation thereof. In this case, when another finger touches an arbitrary position on the screen D with the finger touching the screen being held as it is, or when a predetermined button of the operation unit 7 is operated, a page is jumped to a link destination represented by a link character string in an indicated range.

Furthermore, the CPU 1 determines whether or not link indication information touched by a finger is one or more, and when the link indication information is one, the screen is vibrated and the LED is caused to blink to inform the user that a jump to the link destination is possible. Accordingly, notification at a time when one item of link indication information is specified becomes possible.

The CPU 1 determines whether or not there are plural of link indication information touched by a finger, and when there are plural of link indication information, the content of the screen centered on an indicated point, which is the central point of touching, is displayed in an enlarged manner. Accordingly, by enlargement of the display, the likelihood increases that link indication information touched by a finger becomes one information, making it easier to specify the link indication information. In this case, after the enlargement of the display, when a finger touch is released, the content of the screen is returned to the original size.

A predetermined range (e.g., a range within 3 mm radius) around an indicated position (center) is set as an indication range, and when a link character string is not included in the indicated range, a predetermined range (e.g., a range within 5 mm radius) around the indicated position is specified as an enlarged indicated range, and it is determined whether or not a link character string is included in the enlarged indicated range. Accordingly, it becomes easy to specify link indication information.

Note that in the foregoing embodiment, notification by vibrating the screen, notification by enlarging a link character string and displaying it at another area, and notification by causing the LED to blink are exemplified, however, the casing of the cellular phone device may be vibrated, and notification may be carried out through the state of a screen (e.g., display color or change in brightness), or through a sound. Those may also be combined to carry out notification.

In the foregoing embodiment when another finger touches an arbitrary position on the screen D or when a predetermined button of the operation unit 7 is operated with an operating finger touching the screen D being held as it is, i.e., when there is a multi-tap (double-tap) operation, a jump to a link destination represented by a link character string in an indicated range is carried out. The present invention is, however, not limited to this case, and a jump to the link destination may be carried out when an operating finger touching the link character string is once released and touches the link character string again. This improves the operability.

In the foregoing embodiment, the program to be executed by the CPU 1 is stored in the program area of the memory unit 2 beforehand. The present invention is, however, not limited to this case, and the program may be stored in the recording medium 3 like an SD card. Furthermore, the program may be downloadable through the Internet.

Further, in the foregoing embodiment, a Web page for PC is viewed by the Web browser function, but the invention can be applied to a case where a Web page for cellular phone device is viewed. The invention can also be applied to a case where the content of a file is viewed page by page. That is, a link character string is not limited to one which specifies a Web page in a linked manner, but may specify a data page like a file in a linked manner.

The present invention can be applied to portable terminal devices like a PDA, and information display devices like a computer, in addition to cellular phone devices.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-236236 filed on Sep. 12, 2007 and including specification, claims, drawings and summary. The disclosure of the above Japanese Patent Application is incorporated herein by reference in its entirety.

What is claimed is:

1. An information display device that displays various information on a display screen having a finger touch sensor, the information display device comprising:
    a detection unit that detects an indicated position indicated by a finger touch to the display screen;
    a determination unit that determines whether a display of link indication information is included within a display range having a predetermined size on the display screen and being defined by the indicated position detected by the detection unit, wherein the link indication information indicates a jump to a link destination;
    an informing unit which informs a user that the link indication information is included within the display range when the determination unit determines that the link indication information is included within the display range; and
    a display control unit that displays the link indication information within the display range at another display position different from the display position in the display screen when the determination unit determines that the link indication information is included within the display range and that enlarges the link indication information when displaying the link indication information at the another display position;
    wherein the determination unit determines whether there is at least one additional link indication information included within the display range when it is determined that the link indication information is included within the display range, and the informing unit provides an indication that the jump to the link destination is possible when the determination unit determines that there is at least one additional link indication information included within the display range; and
    wherein the informing unit informs the user that the jump to the link destination, based on the link indication information, is possible by vibrating the display screen so that the user feels the vibration through the finger that touches the display screen.

2. The information display device according to claim 1, further comprising a link execution unit that executes the jump to the link destination when a further predetermined operation is performed in addition to the finger touch to said display position of the link indication information.

3. The information display device according to claim 2, wherein when the user releases the touching to the display position of the link indication information and the display position is touched again, the link execution unit executes the jump to the link destination.

4. The information display device according to claim 2, wherein when the further predetermined operation is performed with the display position of the link indication information being finger-touched, the link execution unit executes the jump to the link destination.

5. The information display device according to claim 1, wherein the determination unit determines whether there are plural of link indication information included within the display range when it is determined that the link indication information is included within the display range, and the information display device further comprises the display control unit that changes over a content of the display screen to an enlarged display screen around the indicated position when the determination unit determines that there are plural of link indication information included within the display range.

6. The information display device according to claim 5, wherein the display control unit returns the content of the display screen to an original display size when the finger touch is released after the enlargement of the display.

7. The information display device according to claim 5, wherein changing the display range to the enlarged display range includes the indicated position when the determination unit determines that the link indication information is not included within the display range, and wherein the determination unit determines whether the link indication information is included within the enlarged display range.

8. A non-transitory program storing medium storing a program that allows a computer executing the program to realize:

a function of detecting an indicated position indicated by a finger touch to a display screen having a finger touch sensor;

a function of determining whether a display of link indication information is included within a display range having a predetermined size on the display screen and being defined by the detected indicated position, wherein the link indication information indicates a jump to a link destination;

a function of informing a user that the link indication information is included within the display range when it is determined that the link indication information is included within the display range; and a function of displaying the link indication information within the display range at another display position different from the display position in the display screen when it is determined that the link indication information is included within the display range and of enlarging the link indication information when displaying the link indication information at the another display position;

wherein the determination function determines whether there is at least one additional link indication information included within the display range when it is determined that the link indication information is included within the display range, and the informing function provides an indication that the jump to the link destination is possible when the determination function determines that there is at least one additional link indication information included within the display range; and wherein the informing function informs the user that the jump to the link destination, based on the link indication information, is possible by vibrating the display screen so that the user feels the vibration through the finger that touches the display screen.

* * * * *